April 18, 1933.     E. C. HEAD     1,903,967
GRINDING APPARATUS
Filed April 29, 1929     2 Sheets-Sheet 1
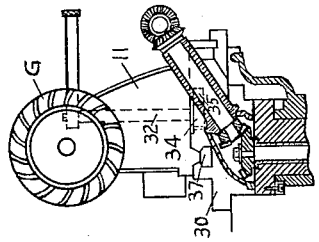
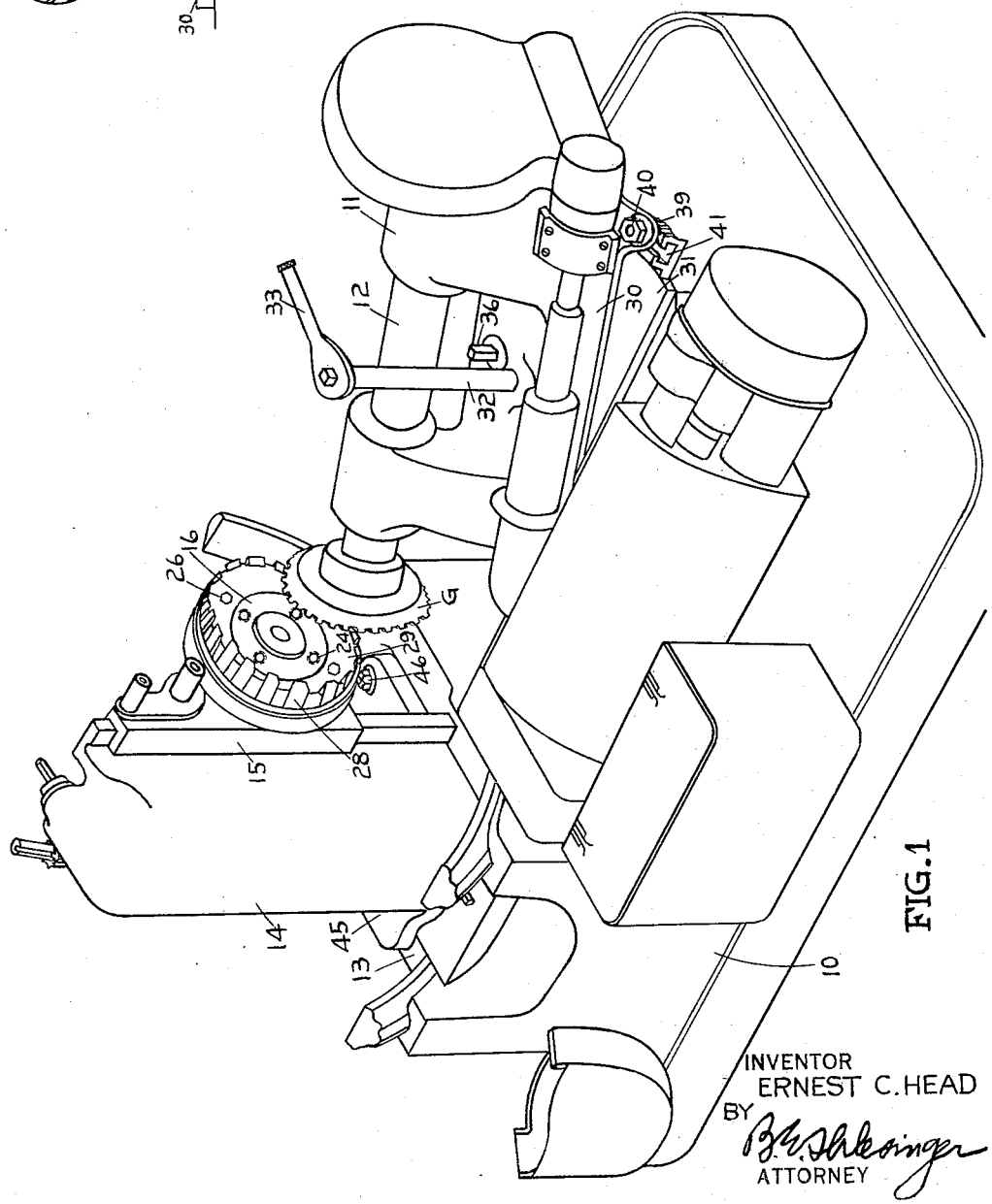
INVENTOR
ERNEST C. HEAD
BY
ATTORNEY April 18, 1933.  E. C. HEAD  1,903,967
GRINDING APPARATUS
Filed April 29, 1929  2 Sheets-Sheet 2

INVENTOR
ERNEST C. HEAD
BY *F. W. Schlesinger*
ATTORNEY

Patented Apr. 18, 1933

1,903,967

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

GRINDING APPARATUS

Application filed April 29, 1929. Serial No. 358,937.

The present invention relates to gear cutting machinery and in particular to machinery employed for the manufacture of spiral bevel and hypoid gears.

The primary object of this invention is to provide apparatus for grinding the noses and front faces of cutter spindles of spiral bevel and hypoid gear cutting machinery when mounted in position on the machine so as to insure that these spindles will be true with their bearings and that the cutters mounted thereon will run true. In other words, this invention has for its purpose to insure extreme accuracy in the mounting of the face mill cutters and to eliminate any possibility of the cutter mounting affecting the accuracy of gears cut on such machinery.

Among other objects, the present invention has for its aim the provision of simple, inexpensive and compact attachment, which may be removably secured to the work head of a gear cutting machine and which may be used in conjunction with the adjustments with which the machine is already provided, to true the nose and face of the cutter spindles so that the cutter will run concentric with the bearings of the spindle.

Other objects of the invention will be apparent hereinafter from the specification and from the disclosure of the accompanying drawings and from the recital of the appended claims.

In the drawings:

Figure 1 is a perspective view of a spiral bevel gear cutting machine of a standard type set up for the cutting of a spiral bevel gear with a rotary annular face mill cutter;

Figure 2 is a fragmentary view of this machine looking at one end of the work head and showing the means for adjusting the work head axially of the work spindle;

Figure 3:
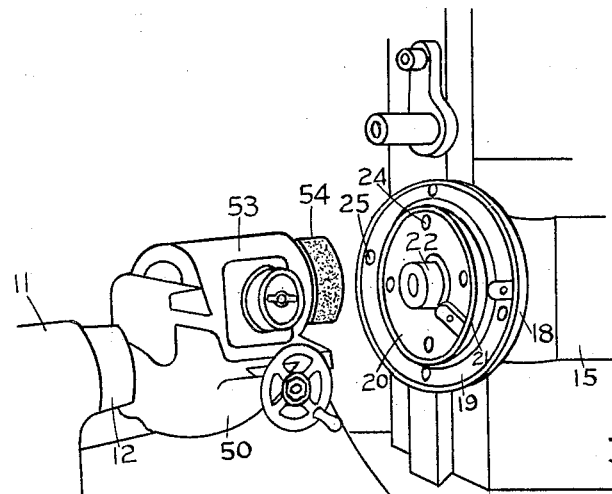
Figure 3 is a fragmentary perspective view of this machine with the cutter and gear blank removed and showing the spindle grinder forming one embodiment of this invention positioned on the work head for grinding the cutter spindle in its bearings.

Machines for cutting gears must be made and must operate with extreme accuracy since an error of as much as a thousandth of an inch in a gear cut upon the machine is often enough to cause rejection of the gear for noise or because it meshes improperly with its mate. In the manufacture of spiral bevel and hypoid gear cutting machinery, it is customary, among other things, to grind the bearing surfaces of the cutter spindles. This insures that the spindle itself will be true, that is, that its bearing surfaces will be concentric with its axis. The bearings for the spindle are, also, ground where plain bearings are used and, of course, if anti-friction bearings are employed for the spindle mounting, these are selected for the highest degree of accuracy. Despite these precautions, however, it sometimes happens that there will be a slight eccentricity between the spindle bearing surfaces and the spindle bearings on the machine. When this occurs, the cutter mounted on the spindle will have a slight "run-out" or eccentricity. In other words, the blades of the cutter will not travel in a path truly concentric of the axis of the cutter spindle. When dealing with quantities such as a thousandth of an inch, it will be readily seen that even the slightest eccentricity of the cutter might cause an appreciable error in the gear cut. It is to remove the possibility of occurrence of this cutter eccentricity that the present invention is designed.

With the present invention, the same precautions in the manufacture of the cutter spindle and the manufacture or selection of the cutter spindle bearings are observed as have been practised heretofore. In addition, after the spindle has been mounted in its bearings, it is ground in place in those bearings. In this operation, the nose and front face of the spindle are ground, as the spindle rotates in its bearings, so that, the nose will be truly concentric of and the front face truly perpendicular to the axis of the spindle as it rotates. This insures that when the cutter is mounted on the spindle, it will run true. The spindle can be thus ground when the machine is first assembled and it is, also, advisable from time to time to check the spindle again and regrind it, if necessary, as inaccuracies may creep in as the spindle and the spindle bearings wear.

The apparatus employed for practising this invention may be made quite simple. The whole attachment can be mounted upon the work head, of the gear cutting machine and the adjustments of the work head can be utilized to position the grinding wheel which forms part of the attachment into operative engagement with the cutter spindle. So, the angular adjustment of the work head which is always provided in taper gear cutting machinery, can be used to set the grinding wheel to grind the correct taper on the nose of the spindle and the in and out adjustment of the work head which permits of setting the blank axially for cone distance may be used to move the grinding wheel into and out of operative relation with the cutter spindle.

For grinding the nose of the cutter spindle, the cutter and gear blank are, of course, removed. When the grinding wheel has been adjusted to the correct angle and brought into operative relation with the nose of the spindle, the two are rotated together. The grinding wheel itself is mounted on a slide which forms part of the attachment which has a transverse adjustment relative to the support which carries the whole attachment and which is intended to be secured to the work head. This transverse adjustment is, preferably, in a direction inclined to the axis of the grinding wheel at an angle equal to the inclination of the outside surface of the nose of the cutter spindle to the front face thereof so that by substituting a suitable wheel for the nose grinding wheel or by dressing the nose grinding wheel to the correct angle, the wheel can be moved back and forth across the front face of the spindle to grind this face. For dressing the side or the end surface of the wheel a diamond can be employed which may be threaded into one of the screw-holes which are already provided in the head of the cutter spindle for the purpose of securing the cutter to the spindle.

For a clearer understanding of the invention, reference may now be had to the accompanying drawings. 10 designates the base or frame of a spiral bevel gear cutting machine, 11 the work head, 12 the work spindle, 13 the cradle, 14 the upright or column on which the cutter head slide 15 is adjustable, and 16 the cutter spindle. The cutter spindle 16 is suitably mounted in the slide 15 and is formed with an enlarged head 18 which serves as a support for the cutter. A usual construction of this head is shown clearly in Figure 4. The head has two front seating faces 19 and 20 which lie in parallel planes perpendicular to the axis of the cutter spindle and two taper portions 21 and 22. These two separate sets of front faces and noses are provided so that the same spindle can be used to mount face mill cutters of different diameters. A cutter of smaller diameter is mounted on the cutter spindle in such manner that the nose 22 enters the bore of the cutter head and the rear face of the cutter head seats against the surface 20 of the spindle and such a cutter can be secured in position on the spindle by means of bolts or screws which engage in the threaded holes 24 in the spindle head. A cutter of larger diameter can be secured to the cutter spindle by mounting it on the spindle head so that the taper portion 21 of the spindle head enters the bore of the cutter head and the rear face of the cutter head seats against the surface 19 of the spindle head. Such a cutter can be secured in position on the head by means of bolts or screws which engage the threaded holes 25 in the spindle head.

Figure 1 shows the large size cutter secured to the cutter spindle by means of bolts or screws 26. The cutter comprises a series of blades 28 which are arranged annularly around and secured to the cutter head 29. This figure shows the cutter in operation upon a gear blank G.

As stated, the machine shown is of a usual construction and in this machine the work head 11 is mounted for sliding adjustment on an angularly adjustable carrier 30 which is adjustable on a swinging base 31. The sliding adjustment of the work head 11 upon the work head carrier 30 is in the direction of the axis of the work spindle 12 and is effected by rotation of the shaft 32, as by means of the wrench 33, this shaft 32 carrying a spur pinion 34 which meshes with a rack 35 which is secured to the work head carrier 30. The work head can be secured in any adjusted position on the carrier by means of bolts 36 which engage in longitudinal T-slots 37 formed in the carrier. This adjustment is used in the gear cutting machine for the purpose of setting the gear blank G to the proper cone distance.

The angular adjustment of the work head carrier 30 on the swinging base 31 may be effected by rotation of a shaft (not shown) which carries a pinion (not shown) which meshes with a circular rack 39 which is secured to the swinging base. This adjustment is employed in the gear cutting machine for the purpose of adjusting the gear blank G so that the root surface of a tooth space will lie in the plane of the tip of the cutter so that teeth of proper depth can be cut on the blank. The work head carrier may be secured in any position of its adjustment on the swinging base by means of the bolts 40 which engage in the T-slot 41 formed in the circular rack 39. These two adjustments, namely, the axial adjustment of the work head and the angular adjustment of the work head and which are necessarily present in the gear cutting machine are used in the present invention to bring the grinding attachment into operative relation with the cutter spindle head to permit grinding of a nose or a front face of the same and to position the side of the grinding wheel so that it can grind the nose to the correct taper.

In addition, in the machine shown there is a horizontal adjustment of the cutter spindle possible by movement of the base 45 of the upright or column 14 on the cradle 13. This adjustment may be effected manually or in any suitable manner and the base 45 can be secured in any adjusted position by means of bolts 46. There is, also, a vertical adjustment, already referred to, of the cutter head support 15 on the column 14. These two adjustments are used in the gear cutting machine to position the cutter so as to cut gears of the desired spiral angle. While the work head adjustments are directly used, it may be found convenient in many cases to use these cutter adjustments, also, to set up quickly and expeditiously for grinding the cutter spindle. In general, it is the purpose of the present invention to make use, as far as possible, of the adjustments already found on the gear cutting machine in the setting and use of the spindle grinder and in this way to keep down the cost and the compass of the grinder.

Figure 4:
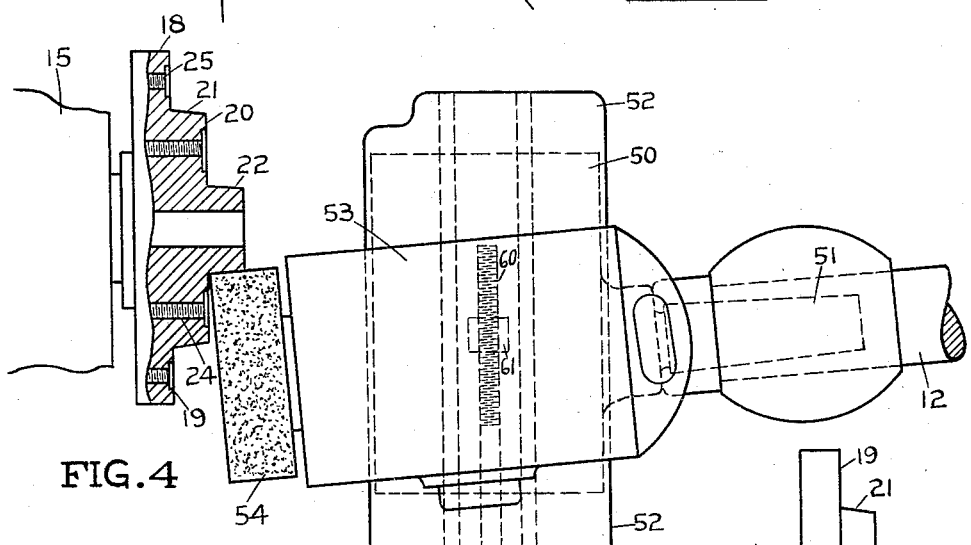
Figure 4 is a plan view of the parts shown in Figure 3, illustrating the grinding of the nose of the cutter spindle.
Figure 5:
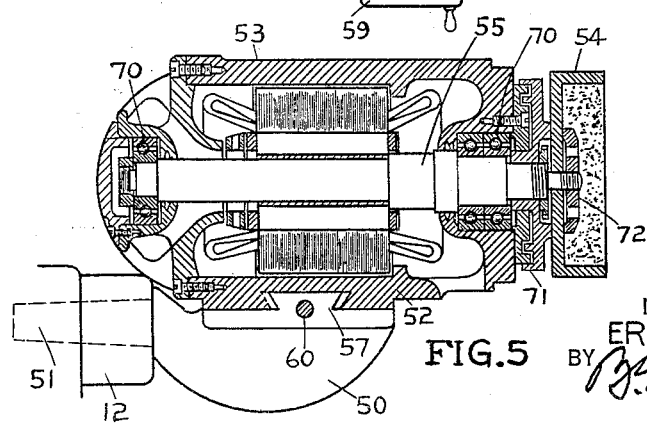
Figure 5 is a partial side elevation, partial sectional view of the spindle grinder.

The grinding attachment forming a preferred embodiment of this invention is clearly illustrated in Figs. 3 to 5 inclusive. It comprises a support 50 having an arm 51, which is adapted to be mounted in the work spindle of the machine, to support the attachment from the work head, a slide 52 movable on the support 50, a motor 53 mounted on the slide and a grinding wheel 54 which is secured to the armature shaft 55 of the motor. The arm 51 of the support 50 is tapered to conform to the taper of the bore of the work spindle 12 and is of sufficient length to rigidly support the grinding attachment from the work head.

The support 50 is of generally rectangular shape as indicated by the dotted lines in Figure 4 and is provided with a dove-tailed guide way 57 which enters a correspondingly shaped groove in the slide 52 to guide the slide 52 in its movement on the support 50. The guide way 57 and corresponding groove are, preferably, inclined at an angle to the axis of the grinding wheel shaft 55 equal to the angle between the side of the nose 22 or 21 of the cutter spindle and the cooperating front face 20 or 19. The slide 52 carrying the motor 53 and the grinding wheel 54 may be moved on the support 50 by rotation of the hand wheel 59 which is carried by the slide 52 and is secured to a screw shaft 60 that threads into a nut 61 which is secured to the support 50 against movement relative thereto.

Figure 6:
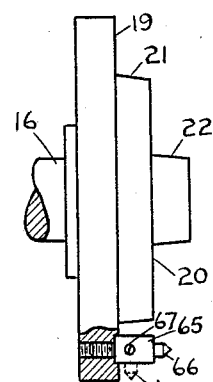
Figure 6 is a fragmentary view of the cutter spindle showing how a diamond may be secured to the spindle for dressing the spindle grinding wheel.

In use, the cutter head is removed from the cutter spindle and the gear blank from the work spindle and the grinding attachment is mounted on the work spindle with the arm 51 entering the bore of the work spindle. The work head carrier 30 is then angularly adjusted so that the side of the grinding wheel 54 will be inclined to the axis of the cutter spindle at an angle equal to the taper which is to be ground on the nose 22 or 21. The work head is then moved by rotation of the shaft 32 and pinion 34 to bring the grinding wheel 54 into operative relation with one of the tapered portions 22 or 21 of the cutter spindle head. The electric motor can then be started to rotate the grinding wheel 54 and the cutter spindle 16 will be simultaneously rotated through the usual mechanism provided in the gear cutting machine for rotating the same. In this way, one of the noses 22 or 21 can be ground so that the cutter when mounted thereon will run absolutely true. The other nose may then be ground or one of the front seating faces 20 or 19. For grinding the front faces 19 and 20, a different wheel may be used having an end face inclined to its axis at an angle equal to the inclination of the side of the nose to the front face of the cutter spindles or the grinding wheel 54 which has already been used to grind the nose or noses may be dressed so that its end face will have the requisite shape. This can be done very readily by screwing into one of the threaded holes 24 or 25 of the cutter spindle, a diamond holder 65, as shown in Figure 6. This holder 65 has holes at right angles to each other drilled therein so that the diamond 66 may be positioned as shown in full lines to dress the front face of the wheel 54 or as shown in dotted lines at 66' to dress the side face of the wheel. The set screw 67 serves to secure the diamond in either position. During the dressing operation, of course, the cutter spindle is held stationary and the rotating grinding wheel 54 is simply moved past the diamond. For dressing the end face of the grinding wheel the slide 52 can be moved by the hand wheel 59 to pass the wheel across the diamond 66, while for dressing the side face of the wheel, the work head 11 of the machine may be moved back and forth by rotation of the wrench 33 to carry the wheel across the diamond.

When the proper wheel has been positioned on the shaft 55 or the wheel 54 dressed to the proper shape for grinding, the end faces 20 or 19, the grinding wheel and cutter spindle are again brought into operative relation and the cutter spindle is rotated by the mechanism of the machine, the grinding wheel is rotated by the motor 53, and simultaneously the grinding wheel is moved across the face 19 or 20 as the case may be, by movement of the slide 52 to grind this face.

The armature shaft 55 is mounted front and rear in anti-friction bearings 70 and a labyrinth seal 71 is provided which prevents dust or grit from getting into the bearings 70. Thus the accuracy of the grinding wheel 54 is insured. The grinding wheel 54, is, of course, detachably secured to the armature shaft 55 by any convenient means, as the nut 72 which threads onto the end of the armature shaft 59.

While the invention has been described in connection with a specific embodiment and in connection with a specific use therefor, it will be understood that it is capable of various further modifications and adaptations and that this application is intended to cover any variations, uses, or adaptations of my invention, following, in general, the principles of the invention and including such departures from the present disclosure as may come within known or customary practice in the gear art and as may be applied to the essential features hereinbefore set forth and as fall within the scope of the invention or the limits of the appended claims.

Having thus described my invention, what I claim is:

1. An attachment for grinding the nose and front face of the cutter spindle of taper gear cutting machines on which the work head is adjustable angularly relative to the axis of the cutter spindle, comprising a rotatable grinding wheel, a slide on which the grinding wheel is mounted, means for driving the wheel comprising a motor housed on said slide and means operatively connecting the armature shaft of the motor to the grinding wheel, a support on which the slide is movable in a direction inclined at an angle to the axis of the grinding wheel equal to the inclination of the front face of the spindle to the side of the nose, and the means for moving the slide on the support, said support having an arm adapted to be detachably mounted in the bore of the work spindle of the machine to carry the support on the work head.

2. The combination with a taper gear cutting machine having a rotary cutter spindle, the nose of which is tapered to enter the bore of a rotary face mill gear cutter and the face of which is tapped to receive the screws by which the cutter is secured to the spindle and on which the work head is adjustable toward and from the cutter spindle and is also adjustable angularly to incline the axis of said work spindle to the axis of the cutter spindle, of an attachment for grinding the nose of the cutter spindle comprising a support adapted to be detachably secured to the work head of the machine, a slide movable on said support, and a grinding wheel rotatably mounted on said slide, said slide being movable on said support in a direction inclined at an angle to the axis of the grinding wheel equal to the angle of inclination of the front face of the cutter spindle to the axis of said cutter spindle, and an attachment for dressing said grinding wheel comprising a support adapted to be threaded into one of the tapped holes in the face of the cutter spindle and which is formed to hold a diamond so that it may extend parallel to the face of the spindle or be perpendicular thereto, and a diamond holder capable of being secured to said support in either position.

3. The combination with a tapered gear cutting machine having a rotary cutter spindle, the end face of which is plane to serve as a seat for a face-mill gear cutter and the nose of which is tapered to enter the bore of the gear cutter to support the cutter on the spindle, and having a work head which is adjustable axially relative to the axis of the cutter spindle for the purpose of bringing a gear blank and the cutter into operative relation, of an attachment for grinding the nose and face of the cutter spindle after the cutter has been removed therefrom, said attachment comprising a support adapted to be secured detachably to the work head of the machine when the gear blank has been removed therefrom, a slide mounted for rectilinear movement on said support, a grinding wheel spindle journaled on said slide so that its axis extends in the direction of the axis of the work spindle when the support is mounted on the work head, and means for moving said slide on said support.

4. The combination with a taper gear cutting machine having a rotary cutter spindle, the end face of which is plane to serve as a seat for a face-mill gear cutter and the nose of which is tapered to enter the bore of the cutter to support the cutter on the spindle, and having a work head which is adjustable angularly relative to the axis of the cutter spindle for the purpose of bringing the gear blank and cutter into operative relation, of an attachment for grinding the nose and end face of the cutter spindle after the cutter has been removed therefrom, said attachment comprising a support adapted to be secured detachably to the work head of the machine when the gear blank has been removed therefrom, a slide mounted for rectilinear movement on said support, a grinding wheel spindle journaled on said slide so that its axis extends at an acute angle to the direction of movement of the slide equal to the angle of inclination of the side of the nose of the cutter spindle to the face of the cutter spindle and so that it also extends in the direction of the axis of the work spindle of the machine when the support is mounted on the work head, and means for moving said slide on said support.

ERNEST C. HEAD.